(12) United States Patent
Müller

(10) Patent No.: US 6,804,322 B2
(45) Date of Patent: Oct. 12, 2004

(54) X-RAY IMAGE CONVERTER, DEVICE AND METHOD FOR RECORDING, PROCESSING AND ILLUSTRATING IMAGES USING X-RAYS

(76) Inventor: Markus Robert Müller, Buchzelgstrasse 21, 8053 Zürich (CH)

(*) Notice: Subject to any disclaimer, the term of this patent is extended or adjusted under 35 U.S.C. 154(b) by 0 days.

(21) Appl. No.: 10/351,351

(22) Filed: Jan. 27, 2003

(65) Prior Publication Data

US 2003/0133535 A1 Jul. 17, 2003

Related U.S. Application Data

(63) Continuation of application No. 09/832,985, filed on Apr. 12, 2001, now abandoned.

(51) Int. Cl.$^7$ ................................. B41M 5/00
(52) U.S. Cl. ..................... 378/28; 378/29; 378/32
(58) Field of Search ..................... 378/28, 29, 31, 378/32; 250/370.08, 370.09

(56) References Cited

U.S. PATENT DOCUMENTS 5,185,772 A * 2/1993 Shirouzu et al. .............. 378/29
5,602,889 A * 2/1997 Oldendorf et al. ............ 378/29

* cited by examiner

Primary Examiner—David V. Bruce
Assistant Examiner—Courtney Thomas
(74) Attorney, Agent, or Firm—Paul Vincent

(57) ABSTRACT

An X-ray image converter (2) for recording and evaluating information gained from X-ray investigations of persons (3), animals or objects is suggested, which comprises a carrier (4) of a material in which the impinging X-ray radiation causes detectable changes, as well as a method for recording X-ray images, wherein changes in charge carriers on the surface of a carrier (4) are determined for evaluation of the radiation from the object (3) being observed.

24 Claims, 3 Drawing Sheets

X-RAY IMAGE CONVERTER, DEVICE AND METHOD FOR RECORDING, PROCESSING AND ILLUSTRATING IMAGES USING X-RAYS

This application is a continuation of Ser. No. 09/832,985 filed Apr. 12, 2001, now abandoned, the entire disclosure of which is hereby incorporated by reference.

BACKGROUND OF THE INVENTION

The invention is based on a device and a method for recording, processing and illustrating X-ray images using an X-ray image converter for recording and evaluating information which can be detected within suitable radiation regions for e.g. X-ray examination of people, animals or objects for scientific and technical purposes to e.g. analyze or control, the converter having a carrier on which the X-ray radiation impinges to effect characteristic changes.

Medicine uses X-rays for diagnosis. In technology, X-rays are used for testing e.g. of materials. Towards this end, the object to be examined is subjected to X-ray radiation. The rays passing through the object are recorded by an X-ray image converter. Known X-ray image converters use e.g. X-ray film which directly records the contrasted, negative projected image. Moreover, polyester sheets coated with barium halogenide crystals are known which are scanned by a laser beam after exposure to X-ray radiation and thereby emit light pulses of an intensity which corresponds to the intensity of the X-rays. The light pulses are evaluated after digital image processing in a computer and can be printed out. A further possibility of visualization of the X-ray image is the use of fluorescence of different substances in the X-ray radiation. X-rays are also used in science and research for a wide range of applications.

Disadvantageously, known X-ray image converters require a considerably high radiation dose for satisfactory evaluation and visualization. This is particularly disadvantageous since recordings must often be repeated. If e.g. CCD cameras or other detector systems are used for recording the light pulses emitted by a crystal coating, the known methods have the further disadvantage that such systems may be damaged with time by the X-ray radiation.

SUMMARY OF THE INVENTION

In contrast thereto, the inventive X-ray image converter having the characterizing features of the present invention as claimed has the advantage that a carrier is used for recordings which is an inexpensive, disposable component which can be replaced after repeated use and having e.g. charge carriers which are detectably changed by the impinging X-ray radiation. Evaluation is carried out not optically via a lens or via secondary light emissions on a screen, but electrically. The inventive system has the further advantage that it is considerably more sensitive than the known methods and image converters and therefore requires a considerably smaller radiation dose. The increased sensitivity is also very advantageous in other applications such as analysis, measuring, control and observation devices.

In accordance with an advantageous design of the inventive X-ray image converter for electrostatic methods, the carrier consists of an insulating, electrically well chargeable material, in particular a plastic sheet. This material may contain air or gas in small cavities. This material has the advantage that even low radiation energy deposition already causes changes in the charge carriers which, however, do not discharge immediately. Scanning of the change in the charge carriers is thereby possible within a certain time after exposure to the X-ray radiation.

In accordance with a further advantageous embodiment of the invention, one side of the carrier is provided with an electrically conducting coating. This causes uniform electric charging of that side and also direct contact with the carrier, which is an insulator and which only becomes weakly conducting during irradiation. This coating permits an increase in sensitivity and uniformity.

In accordance with a further advantageous embodiment of the invention, the other side of the carrier is provided with a plurality of electrically conducting surfaces which are electrically insulated from one another. They are also electrically insulated from the conducting layer described in the above paragraph. The plurality of surfaces form, together with the opposite surface, a plurality of separate capacitors having a certain capacitance. These surfaces form so-called pixels which are ideally square and uniform but may also have other shapes. The size, number and distribution of these surfaces depend on the required resolution and also on other parameters such as sensitivity, noise and scanning methods.

Immediately before recording with e.g. X-rays, the two sides are charged (polarized) with a constant D.C. voltage applied across the two sides. If the surface is fully covered, one single contact is sufficient. In the case of one side having pixels, all surfaces must be contacted. This may be effected e.g. by a roller or in an analogous fashion. The detecting device or scanning device can also be configured to perform this task. The charging contacts are then removed and irradiation follows to effect charge exchange and thereby a voltage drop at the individual capacitors or pixels. The voltage drop at each individual pixel is a function of the radiation intensity at this pixel or in the carrier layer (dielectric) of this pixel. After irradiation, the pixels are scanned as quickly as possible which may occur through contact or without contact (capacitively, through electrostatic induction) or in a different conventional manner.

To increase the capacitance on the pixel surfaces, several layers of conducting laminates can be used, which are connected as required. In the basic version, the layers are parallel to the carrier. However, to increase the capacitance, facilitate production, or for other reasons, the conducting layers must not necessarily be parallel to the carrier.

The principle of operation in the above embodiment can be modified while still maintaining an operable device. The conducting surfaces increase the scanning capability and the signal-to-noise ratio. In accordance with further advantageous embodiments of the invention, solutions other than conducting surfaces are possible. Omission of the pixel layer may produce a better resolution. There is, however, the associated risk of systematic errors and increased noise. Moreover, other conventional physical methods which react to irradiation may be utilized optionally, and if advantageous, combined with the embodiment described above.

The carrier is basically passive. In accordance with an advantageous embodiment, electric conductors and current circuits, and furthermore passive and/or active elements may be used on or in the carrier, e.g. to generate or prolong maintenance of the polarization voltage, to intensify signals or to improve transmission to the detector device. Such devices can be powered and the information read-out via contacts, inductively, capacitively or in a different conventional fashion.

In an advantageous embodiment of the invention, the measurement of the electric voltage at the individual pixels may occur simultaneously with irradiation. In this case, the current to or from the pixels or the resistance may be measured, since each of these quantities depends on the intensity of the rays at the respective pixel. The information content can be read out from the carrier during or following irradiation. In this case as well, the pixels must be charged before or during irradiation.

To extend the time between charging, irradiation and scanning, or for other reasons, one or more masks can be used, having specific geometric and electric properties with respect to the carrier, which influence the pixel surfaces just before irradiation, using contacts or in a different fashion. An analogous or the same method may be carried out between irradiation and scanning. Even during irradiation, the use of a mask may be advantageous. The mask is preferably disposed parallel to the carrier and can possibly contact or nearly contact the carrier. In another embodiment, the mask may be a roller which rolls over the carrier or vice versa. In a further embodiment, the mask completely or partially follows the movements of the carrier on the surface to be irradiated for imaging. The mask may also be on the side facing the rays as long as radiation attenuation is negligible or can be compensated for. In that case, it could be combined with a shadow casting device.

The carrier may consist of more than one layer (sheet) or several carriers can be used at the same time. The different layers or carriers can have specialized functions, can supplement one another, and can cooperate. They can move together, partially together, or differently.

The invention may also be used with radiation other than X-rays, depending on the purpose and type of carrier, e.g. with alpha, beta and gamma radiation. Detection of other particles and their tracks or of cosmic radiation is also possible in this fashion.

In accordance with an advantageous embodiment of the invention, magnetic fields or magnetic field changes can be recorded which can also be processed and represented as two- or three-dimensional images. The carrier is equipped with appropriate conventional devices such as electric circuits and/or materials having magnetic properties and the detector device is correspondingly adjusted. To increase the sensitivity and accuracy, the carrier, its materials or parts thereof may be pre-magnetized or saturated before and/or during recording.

In accordance with a further advantageous embodiment of the invention, a detector device is provided which can be moved relative to the carrier for detecting the information contained on the carrier. The movement between the detector device and the carrier is parallel to the carrier surface, in one or two directions. After the action of the incident radiation, the carrier is scanned by the detector device. Since the carrier material is insulating, scanning can occur within a certain time following action of the X-rays. The detector device can thereby easily be protected from the radiation and is therefore not damaged.

In accordance with a further advantageous embodiment of the invention, the detector device can be moved over the carrier in two directions. The carrier itself is thereby stationary. The detector of the detector device may be punctiform. If several detectors are disposed next to one another to produce a detector device with one-dimensional extent, it is sufficient to move same in one direction relative to the carrier.

In accordance with a further advantageous embodiment of the invention, the carrier, e.g. the plastic sheet, is disposed on rollers or cylinders to permit movement of the carrier relative to the detector device.

In accordance with a further advantageous embodiment of the invention, the detection device within the detector is a field effect transistor or an integrated amplifier provided with a field effect transistor at the input thereof.

In accordance with a further advantageous embodiment of the invention, a field effect transistor is used as the detection device in the detector, however, without a gate. The electric field of the carrier surface thereby directly influences the current between the source and drain, instead of the controlling gate electrode. This influence is recorded and evaluated. Scanning of the carrier surface may be effected without contact. Therein, it is possible that many measuring points simultaneously act over a complete line width, similar to fax devices or paper sheet scanners.

In accordance with a further advantageous embodiment of the invention, several carriers are disposed in different spatial positions relative to the object to be recorded for recording spatially resolved information. In this case, at least 2 X-ray radiation sources should be provided or the position of the source should be changed relative to the object.

In accordance with a further advantageous embodiment of the invention, the information recorded by the detector device is evaluated and displayed by means of a computer. The X-ray images may be stored in the computer, printed out by printers or processed in a different fashion.

In a preferred embodiment, scanning is effected, e.g. immediately in front of the rollers.

In an advantageous embodiment, the detection device and method depend on the physical properties of the carrier. The scanning roller may e.g. have contact points which contact the pixels individually to scan the information, or conducting surfaces, optionally below a thin insulator, which scan the pixels without electric contact, e.g. capacitively. If deflecting rollers simultaneously carry out scanning, the pixels are usually on the side facing the scanning rollers.

For certain cases, it is sufficient to move the detector device in only one direction, e.g. across the longer side of a rectangle, if its detectors are distributed over the entire width, i.e. across the shorter side of the rectangle, similar to a flat bed scanner for paper sheets. The detector device must have a number of detector points required for the resolution.

In accordance with an embodiment of the invention, two or more information planes permit calculation of e.g. improved image resolution and three-dimensional information, since i.a. the positions of radiation sources, objects and carrier levels are known. The planes can be parallel to one another in their simplest embodiment or may also have different orientations.

Intermediate layers can be used to increase sensitivity by, e.g. increasing the capacitance or through the addition of active agents.

In an embodiment of the invention, the recording planes are disposed not one behind the other but next to one another, with respect to the path of the rays.

In embodiments of the invention, the image converter does not record the radiation originating directly from the radiation source as influenced by the absorption effects of the objects being examined. Rather, radiation sources within the object itself become sources following irradiation by the actual primary radiation source. This point is partially related to applications using optical microscopes with which the object is not observed using transmitted light but rather e.g. in the dark field. In this case, the image converters are usually not in the path of the rays of the radiation source, as in classical X-ray recordings, but lateral or transverse thereto and are shielded from the primary radiation. It is possible to simultaneously use several converters in accordance with the invention, even with only one primary radiation source. The optimum angle or orientation depends on the physical mechanism utilized. Deflection angles and other parameters which are further processed later for evaluation and representation can be calculated numerically in a computer using the inventive converter and must not necessarily be searched for through mechanical adjustments, if the converters are sufficiently large. A special case of this embodiment involves sources in an object which are not secondary but actually primary, i.e. real sources, in particular radioactive sources, such as radioactively marked capsules, agents, medication, tools, instruments, and also sources in space or on the earth. When the effects and the inventive converter are reasonably combined, e.g. through application of fluorescence effects, use of selective filters and spatial image recording, and/or through orientation of X-ray source and converter in a same direction, even in close proximity to one another, or installed in the same housing, e.g. mines, explosives or other objects can be detected at large distances. With substances comprising phosphorescence effects, the primary source is switched on for illumination, is then switched off and the recording is started immediately thereafter.

To improve contrast, selectivity and sensitivity, reference recordings are taken with and without the object, but without searched features to be imaged (e.g. source of an illness, instruments, foreign bodies), and the features to be searched and their physical properties are recorded separately and are taken into consideration numerically during evaluation and image representation.

In an advantageous embodiment of the invention, an auxiliary means casts defined shadows (in the relevant spectral range of the recording) onto the converter. In a simple embodiment, identical round short rods of a suitable material, e.g. aluminum, are used, which are perpendicular to the converter. The rods have a similar effect as a sun-dial. The angle of impingement can be determined numerically or in a different fashion and can be displayed. In an embodiment, the auxiliary means can be easily aligned towards the source because the shadows thereby become minimal in size, reflecting maximum absorption. In a similar manner, alignment towards secondary sources is also possible. One or several primary or secondary sources can be represented as an image or in a different manner following numerical processing. In principle, one rod is sufficient, however, a grid, mesh or another formation can also be used instead of rods. The length of e.g. the rods or the distance from the recording plane is determined i.a. by the required angular resolution and the resolution of the converter.

In an embodiment, the plastic material of the membrane is polarized during production to always permit subsequent build-up of an electric voltage. Methods known from microphone technology can be modified for the inventive application in the carrier, to facilitate or omit charging before irradiation.

Further advantages and advantageous embodiments of the invention can be extracted from the following description, the drawing and the claims.

The drawing shows an embodiment of the invention which is described in more detail below.

DESCRIPTION OF THE PREFERRED EMBODIMENT

Figure 1:
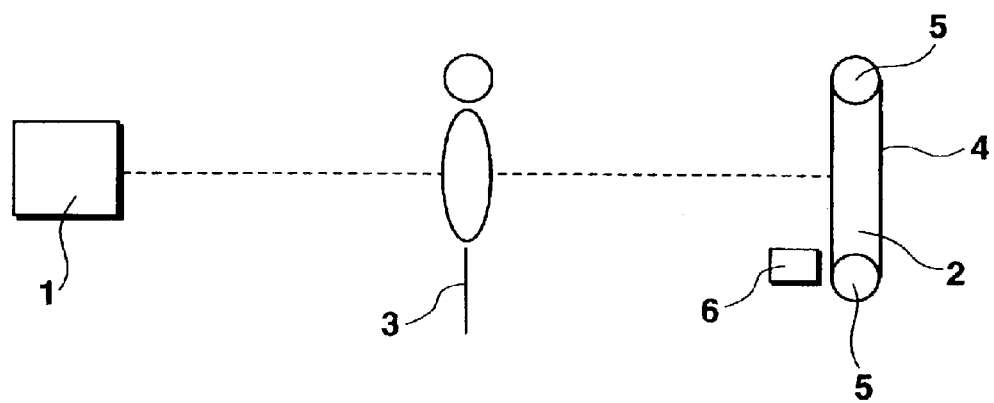
FIG. 1 shows a schematic representation of an arrangement of an X-ray source, a person to be examined and an X-ray image converter.

FIG. 1 shows an arrangement of X-ray source 1 and X-ray image converter 2 for recording X-ray images of a person 3. The X-ray converter comprises a plastic sheet 4 carrier which is disposed on two rollers 5 which can support and transport the sheet. The plastic sheet 4 can have a thickness of fractions of to tens of centimeters. After impingement of the X-rays on the plastic sheet 4, the sheet 4 is rolled over the rollers and moved past a detector device 6. The detector device 6 is not subjected to X-ray radiation and can therefore not be damaged thereby. The sheet and rollers may comprise a precise guidance, e.g. a pin feed system and have synchronization markings. In the present example, the sheet is an endless belt.

The detector device has a longitudinal extension parallel to the rollers (not visible in the drawing) and must therefore not be moved over the plastic sheet since the sheet itself moves over the detector device along its entire width. The detector device may be connected to a computer via appropriate leads for evaluation of the scanned voltage differences.

Depending on the intensity of the radiation and on the properties of the plastic sheet, a charge difference may occur not only on the side of the plastic sheet facing the X-ray source 1 but also in the area of the plastic sheet 4 facing away from the X-ray source. For evaluation, both regions of the plastic sheet can be used.

Figure 2:
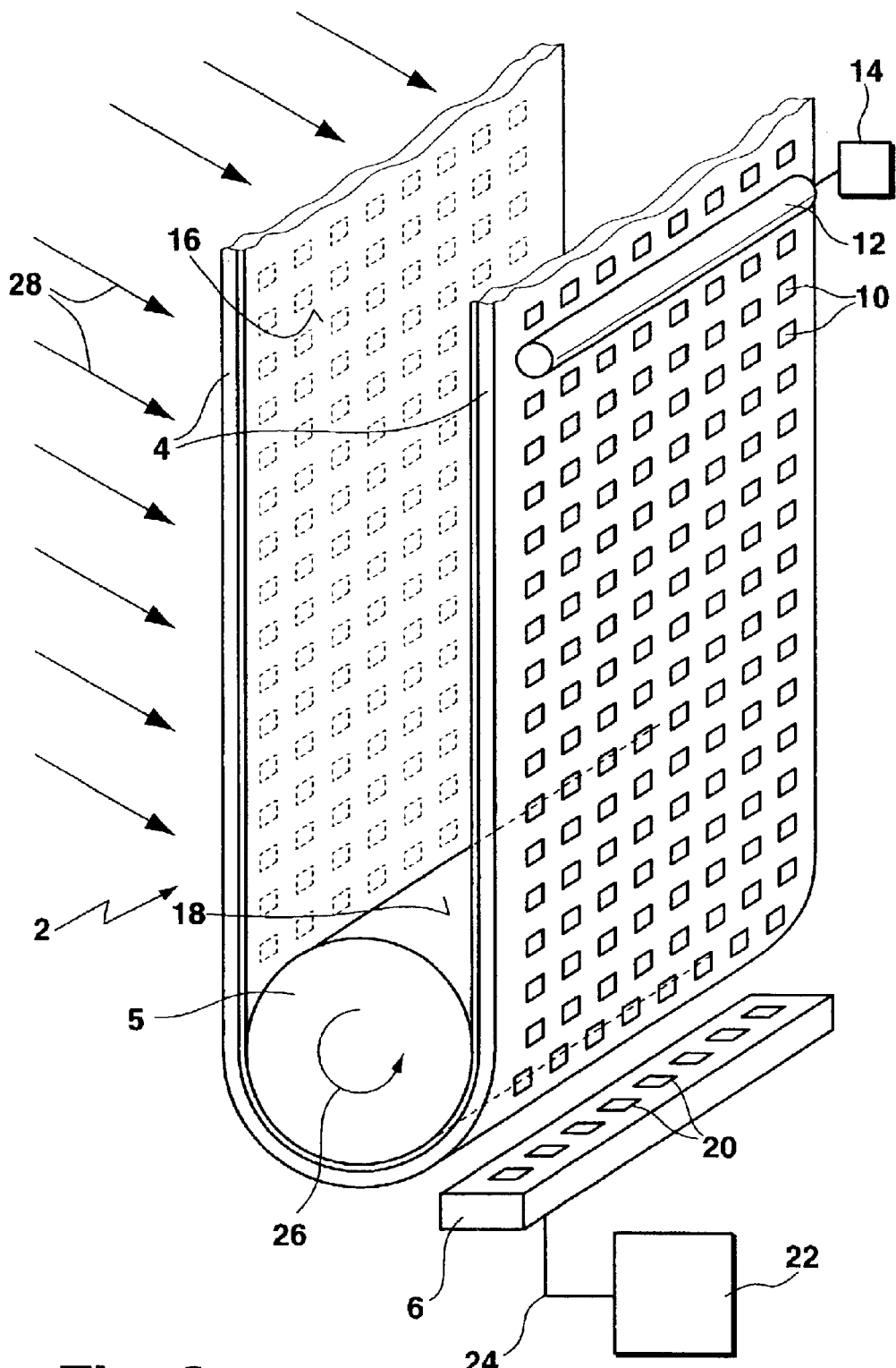
FIG. 2 shows an first embodiment of the X-ray image converter in accordance with the invention.

FIG. 2 shows an embodiment of an X-ray converter 2 in accordance with the invention. A partial section of the entire converter of FIG. 1 is illustrated, including the lower roller 5. The plastic sheet 4 is illustrated with exaggerated thickness for reasons of clarity. Referring to the rear portion of the converter 2 at the right hand part of FIG. 2, the plastic sheet 4 is seen to be lined on one side thereof with an array of mutually separated electrically conducting pads 10. The pads 10 are electrically insulated from each other via the plastic sheet 4. A charger 12 is disposed proximate the converter 2 and contacts the pads 10 to apply electrical charge thereto. The charger 12 is connected to an appropriate power supply 14. As can be seen on the left portion of FIG. 2, the side of the plastic sheet 4 opposite to the pads 10 is covered with a uniform electrically conducting sheet 16. The sheet 16 can be maintained at ground potential through contact with an electrically grounded and conducting surface 18 of the lower roller 5. A detector device 6 is located at the lower rear portion of the converter 2 and comprises a linear array of detection units 20. The detection units communicate with an analysis unit 22 via suitable cable connection 24.

The embodiment of FIG. 2 operates as follows. In an initial step the rollers 5 of FIG. 1 (only the lower one of which is illustrated in FIG. 2) are set into rotation by a suitable drive motor in the direction indicated by arrow 26. The pads 10 located at the rear of the converter 2 thereby pass by charger 12 and are thereby charged to a suitable voltage which is typically in the range of 50 to 100 volts. As the lower roller 5 continues to rotate, the plastic sheet with its associated charged pads 10 travels over the top roller 5 (see FIG. 1) and proceeds in a downward direction at the front, left portion of the converter 2. At this point in time, rotation of the lower roller 5 is interrupted and the converter is exposed to X-ray radiation 28. The X-ray radiation passes through the thin layer of pads 10 and penetrates into the plastic sheet 4 to ionize materials in the plastic sheet 4. As a result of these ionization processes, a voltage decrease between a given pad 10 and the oppositely disposed conducting sheet 16 occurs which is proportional to the X-ray dose absorbed by that portion of the sheet 4 proximate a given pad 10 and therefore to the X-ray intensity incident on that pad 10. Following exposure, the X-ray source 1 (see FIG. 1) is switched off and the rollers 5 are once more set into rotation in the direction of arrow 26. Exposed pads 10 are thereby caused to pass by detector array 6 which detects the residual voltage in the respective pad 10 by means of detection units 20 and passes this information on to analysis unit 22 for image construction.

Figure 3:
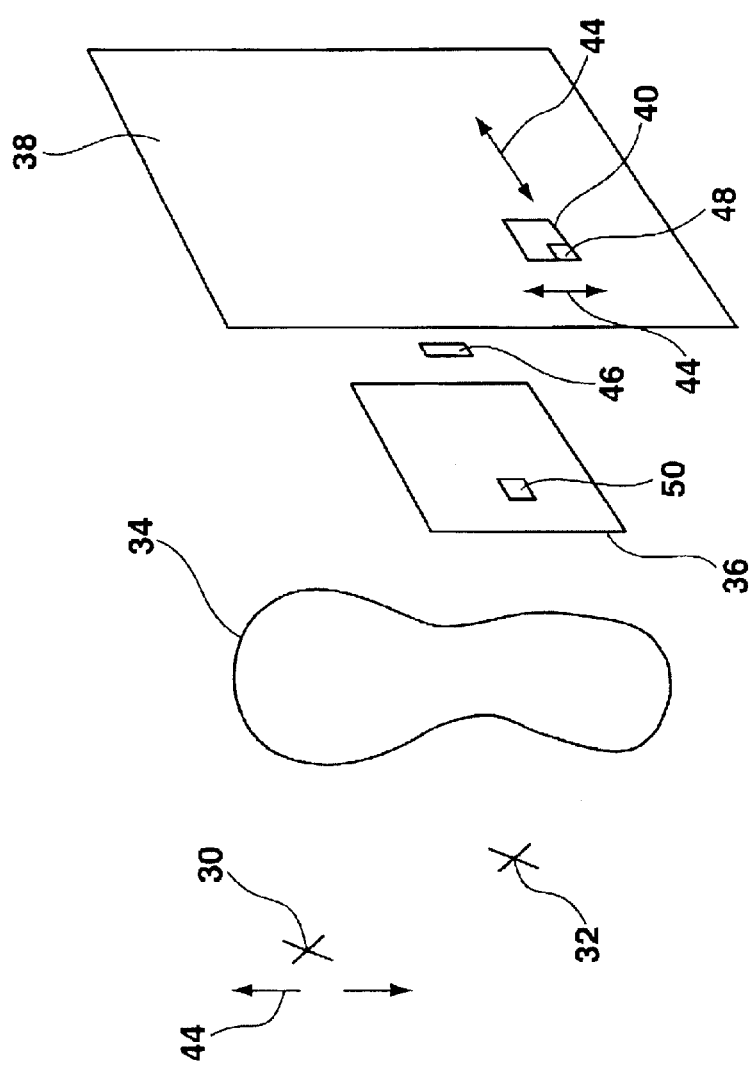
FIG. 3 shows an a second embodiment of the X-ray image converter in accordance with the invention.

FIG. 3 illustrates aspects of a further embodiment of the invention. In this embodiment, the detector 40 has associated mechanics 44 for displacement thereof in one or two dimensions relative to the converter 38. The detector 40 incorporates an FET/operational 48 amplifier for detecting the image recorded on the converter 38. An additional second converter 36, can be used to construct a cooperative image of the target 34 in conjunction with irradiation thereof by a first 30 and/or a second 32 X-ray source. At least one X-ray source 30 may have associated means 44 for mechanical displacement thereof to provide one X-ray source radiating at two anode regions 30, 32. A shadow casting arrangement 46 may also be deployed. The first converter 36 has associated detection means 50.

All the features shown in the description, the following claims and the drawing may be essential to the invention either individually or collectively in any arbitrary combination.

List of Reference Numerals
1 X-ray source
2 X-ray image converter
3 person
4 plastic sheet
5 roller
6 detector device
10 pads
12 charger
14 charger power supply
16 conducting sheet
18 roller ground surface
20 detection units
22 analysis unit
24 cables
26 rotation direction
28 impinging X-rays
30 first X-ray source
32 second X-ray source
34 target
36 first converter
38 second converter
40 detection unit
42 detection unit displacement means
44 X-ray source displacement means
46 shadow casting means
48 Fet/operational amplifier
50 detection unit

I claim:

1. An X-ray image converter system for recording and evaluating information detected from a target, the image converter comprising:
an imaging means for converting and recording charge deposition following passage of X-rays through the target and subsequently through said imaging means, said imaging means consisting essentially of a sheet of plastic and at least one electrically conducting electrode layer disposed on at least one surface of said sheet;
means for electrostatically charging said electrode layer; and
a detector communicating with said plastic sheet to detect a charge deposition pattern in said plastic sheet caused by said passage of X-rays, wherein said detector scans said electrode layer after exposure to the X-rays for measuring charge or voltage differences caused by irradiation.

2. The system of claim 1, wherein said imaging means is structured and dimensioned for converting and recording charge deposition following passage of X-rays through one of a person, an animal and an object of scientific or technical analysis or control.

3. The system of claim 1, wherein said detector scans a surface of said plastic sheet during relative motion with respect to said plastic sheet.

4. The system of claim 1, wherein said electrode layer comprises a plurality of pixels.

5. The system of claim 4, wherein said detector communicates with said pixels.

6. The system of claim 4, wherein said detector comprises a field effect transistor for scanning said pixels.

7. The system of claim 6, further comprising an operational amplifier, wherein said field effect transistor is an input to said operational amplifier.

8. The system of claim 4, further comprising a second electrode layer disposed on a surface of said plastic sheet opposite to said pixels.

9. The system of claim 1, further comprising rollers for retaining and moving said plastic sheet relative to said detector.

10. The system of claim 1, further comprising rollers for retaining and moving said plastic sheet relative to said detector.

11. The system of claim 1, wherein said plastic sheet can be moved relative to said detector.

12. The system of claim 1, wherein said plastic sheet comprises at least two plastic sheet planes disposed one behind another with respect to a path of the X-rays, wherein said two plastic sheet planes are exposed simultaneously and subsequently scanned to enhance imaging.

13. The system of claim 1, wherein one side of said plastic sheet is provided with an electrically conducting coating.

14. The system of claim 1, wherein one side of said plastic sheet comprises a plurality of electrically conducting insulating surfaces which form pixels or individual image points.

15. The system of claim 1, wherein two surfaces of said plastic sheet are structured and dimensioned to accept charge from an electric voltage before irradiation, wherein a charge or voltage difference is reduced through irradiation in such a manner that, after irradiation, an electric voltage or voltage difference between said two surfaces is present at individual image points.

16. The system of claim 1, further comprising a second imaging means consisting essentially of a second plastic sheet disposed at a different spatial position relative to the target than said first plastic sheet.

17. The system of claim 1, further comprising means for irradiating the target with X-rays from two spatially separated source locations.

18. The system of claim 1, further comprising a computer for evaluating and displaying information, recorded by said detector.

19. The system of claim 1, wherein secondary radiation from the target is evaluated and represented as an image.

20. The system of claim 19, wherein said secondary radiation is at least one of stray radiation, flourescence radiation, diffraction radiation, afterglow radiation, and polarized radiation.

21. The system of claim 1, further comprising a shadow casting attachment mounted in front of the converter to determine a direction of impinging irradiation by means of shadows cast by said attachment.

22. The system of claim 21, wherein said shadow casting attachment generates a plurality of shadows.

23. The system of claim 1, wherein an electret independently creates D.C. voltage (polarization voltage).

24. A method for X-ray image conversion for recording and evaluating information detected from a target, the method comprising the steps of:

a) converting and recording, using an imaging means charge deposition following passage of X-rays through the target and subsequently through said imaging means, said imaging means consisting essentially of a plastic sheet and at least one electrically conducting electrode layer disposed on at least one surface of said plastic sheet;

b) electrostatically charging said electrode layer; and c) communicating, using a detector, with said plastic sheet to detect a charge deposition pattern in said plastic sheet caused by said passage of X-rays, wherein said detector scans said electrode layer after exposure to the X-rays for measuring charge or voltage differences caused by irradiation.

* * * * *